United States Patent [19]

Grover et al.

[11] Patent Number: 4,926,446
[45] Date of Patent: May 15, 1990

[54] METHOD AND APPARATUS FOR PRECISION TIME DISTRIBUTION IN TELECOMMUNICATION NETWORKS

[75] Inventors: Wayne D. Grover; Thomas E. Moore, both of Edmonton, Canada

[73] Assignee: Alberta Telecommunications Research Centre, Edmonton, Canada

[21] Appl. No.: 275,888

[22] Filed: Nov. 25, 1988

[51] Int. Cl.$^5$ ............................................. H04L 7/10
[52] U.S. Cl. ..................................... 375/109; 455/69; 455/5; 370/103; 370/104.1
[58] Field of Search ................. 375/107, 109; 370/86, 370/89, 90, 103, 104.1; 340/825.14, 825.54; 455/69, 51

[56] References Cited

U.S. PATENT DOCUMENTS

4,337,463  6/1982  Vangen .......................... 340/825.54
4,411,007 10/1983  Rodman et al. ..................... 375/109

FOREIGN PATENT DOCUMENTS

1136864 12/1982 Canada .
1158739 12/1983 Canada .

OTHER PUBLICATIONS

J. Ellson, "Synchronous Transmission", contribution to ECSA T1 Standards Project, T1X1.4/86-479, Nov., 1986.
J. Ellson, "Provision for Time Synchronization in Sonet", contribution to ECSA T1 Standards Project, T1X1.4/86-480, Nov., 1986.
F. Ghazvinian and F. Davarian, "Time Synchronization and Ranging System", presented at ICC '82 Philadelphia, Pa., Jun., 1982.
W. C. Linsey and A. V. Kantak, "Mathematical Models for Time Transfer Networks", *Proc. Int. Conf. Commun.*, Toronto, Canada, Jun., 1978.
C. E. Ellingson and R. J. Kulpinski, "Dissemination of System Time", IEEE Trans. Commun., vol. COM-21, No. 5, pp. 805-824, 1973.
H. A. Stover, "Improved Time Reference Distribution for a Synchronous Digital Communications Network", Proc. 8th Annual Precise Time and Time Interval (PTTI) Application and Planning Meeting (U.S. Naval Res. Cen., Nov., 1976), pp. 147-166.
C. C. Costain, "Time Transfer via Geostationary Satellites", Proc. IEEE, vol. 74, No. 1, pp. 161-162, 1986.
W. C. Lindsay and H. J. Choi, "Mutual Synchronization of Two Oscillators", presented at NTC 82, Galveston, Tex., Nov., 1982.
J. Yamato, M. Ono, and S. Usuda, "Synchronization of a PCM Integrated Telephone Network", *IEEE Trans. Commun. Technol.*, vol. COM-16, No. 1, pp. 1-11, 1968.
E. Detoma and S. Leschiutta, "The SIRIO-1 Timing Experiment", Alta Freq. (Italy), vol. 51, No. 5, pp. 263-274, 1982.
W. C. Lindsey et al., "Network Synchronization", Proc. IEEE, vol. 73, No. 10, pp. 1445, 1467, Oct., 1985.
W. C. Lindsey and A. V. Kantak, "Network Synchronization by Means of Returnable Timing System", IEEE Trans. Commun., vol. COM-26, No. 6, pp. 892-896, 1978.

*Primary Examiner*—Benedict V. Safourek
*Assistant Examiner*—Marianne Huseman
*Attorney, Agent, or Firm*—Anthony R. Lambert

[57] ABSTRACT

A series of nodes in a telecommunications network are connected by a bi-directional transmission path. An outgoing signal passes each of the intermediate nodes in the path and sets a counter timing at each intermediate node. The outgoing signal then returns from the loop node with time information attached to it. As the returning trigger signal passes the intermediate nodes, the intermediate nodes stop counting the elapsed time since the trigger signal passed the intermediate node, and latches the time information. Precision time synchronization information is then determined for each intermediate node by halfing the two way travel time from the intermediate node to the loop node, adjusting for propagation and processing delays, and adding it to the time information from the loop node.

17 Claims, 4 Drawing Sheets

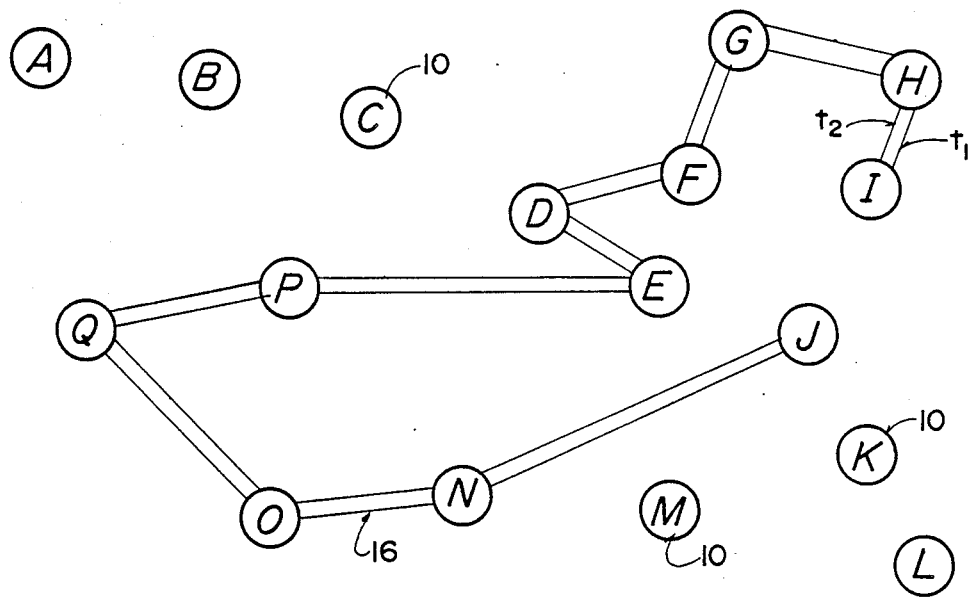
FIGURE '1'

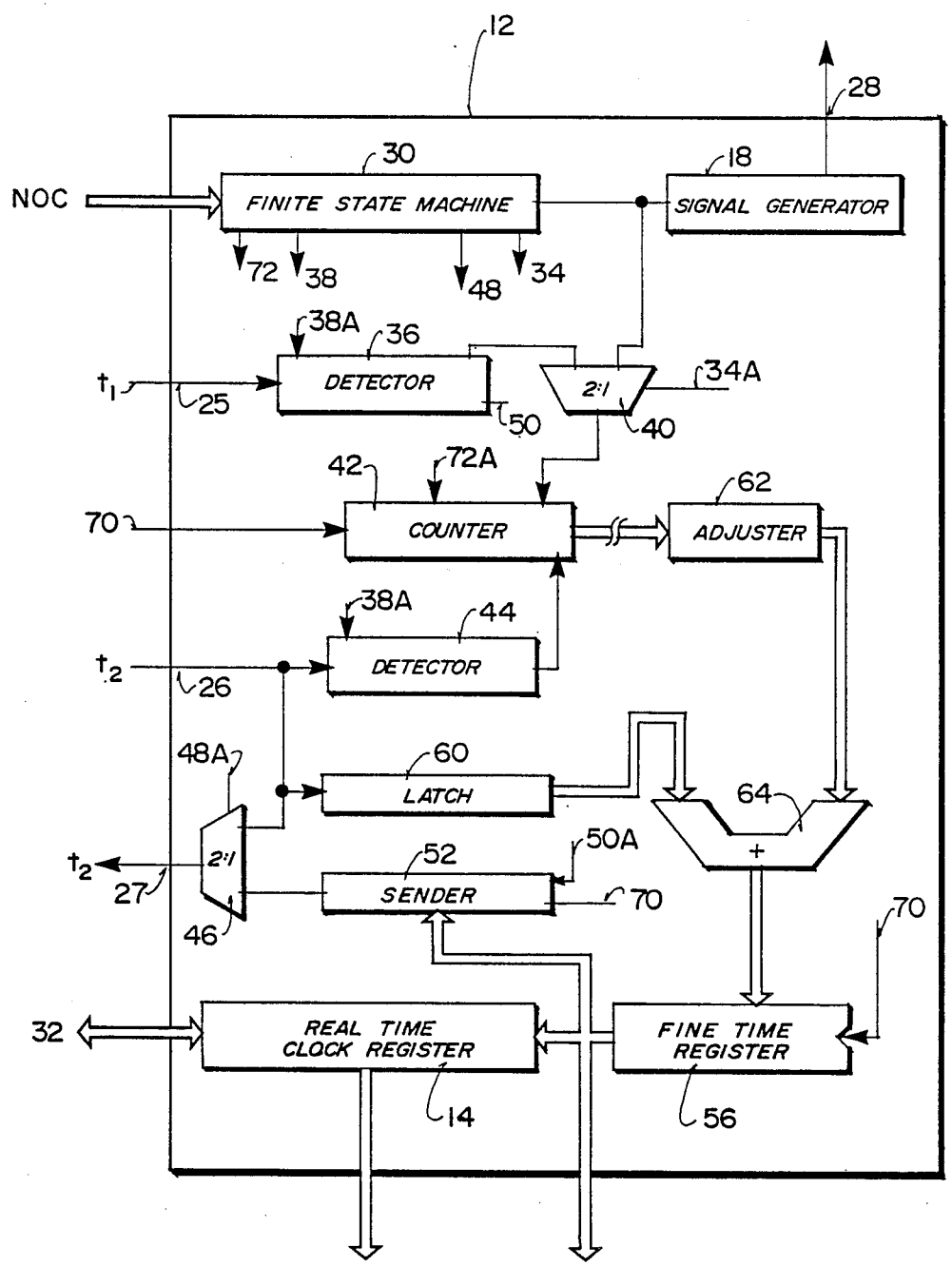
FIGURE '3'

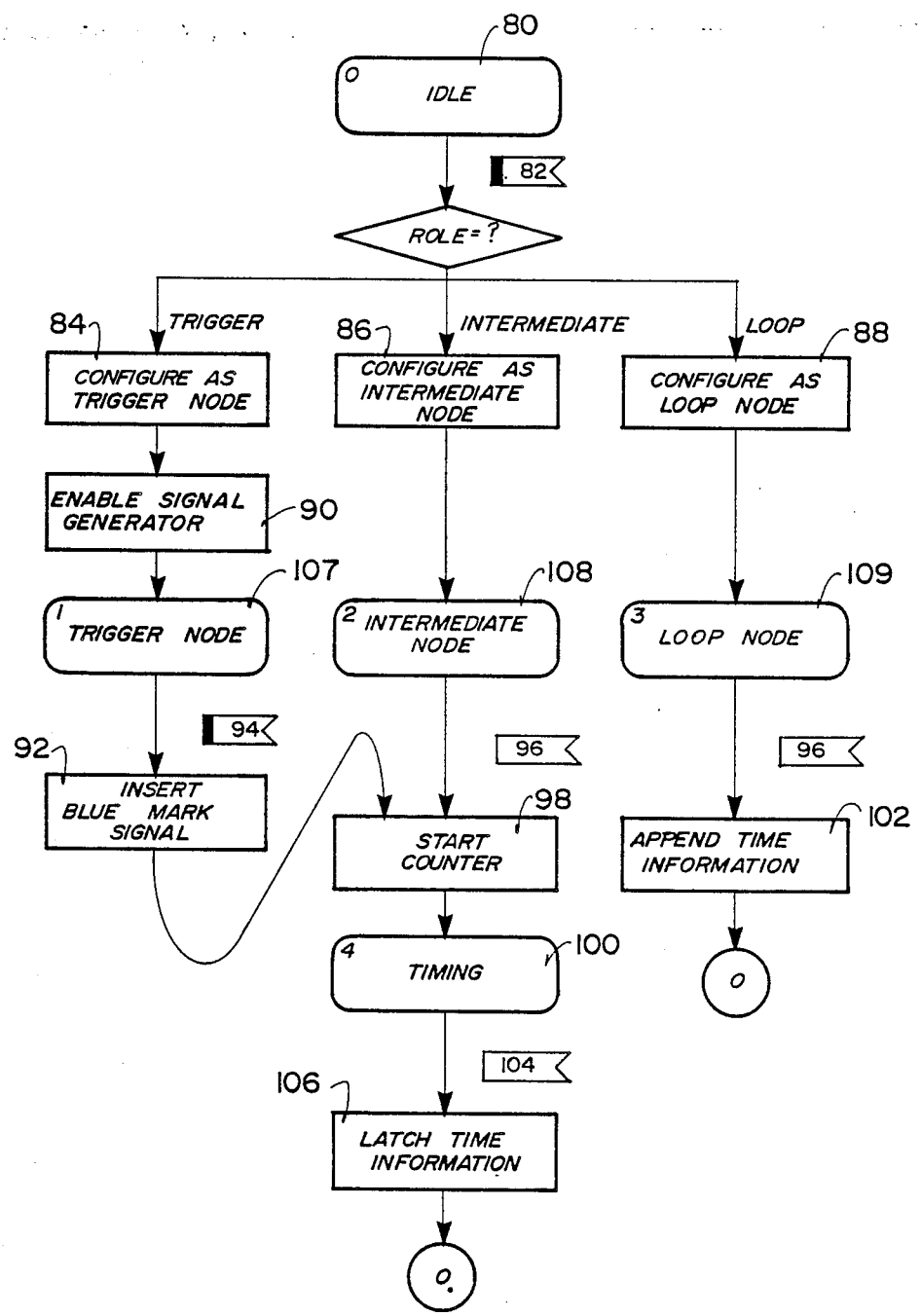
FIGURE '4'

METHOD AND APPARATUS FOR PRECISION TIME DISTRIBUTION IN TELECOMMUNICATION NETWORKS

FIELD OF THE INVENTION

This invention relates to a method and apparatus for the absolute time synchronization of spacially distributed nodes in a telecommunications network.

BACKGROUND OF THE INVENTION

In large communication systems (networks), such as telephone systems, navigation systems and data gathering systems, it is desirable for various applications to synchronize the spacially distributed elements (network elements) of the network in frequency and in some cases for absolute time.

Frequency synchronization of a network means that the significant-instants of the network elements occur at the same rate. Time synchronization of a network means that all the network elements agree on the unique identification of a set of significant instants. Time synchronization of a network may be either offset time synchronization or absolute time synchronization. In offset time synchronization, the individual instants in a set may occur at different absolute moments to an outside observer. In an absolute time synchronized network, each significant instant occurs simultaneously to an outside observer who is positioned equidistant from all network nodes.

This invention provides for achieving near absolute time synchronization of a network, which will be referred to as precision time synchronization.

METHODS FOR TIME SYNCHRONIZATION OF NETWORKS

Approximate time synchronization of networks may be obtained in numerous ways and the objective of these methods is to reduce time identification errors between the network elements. If all the network element clocks in a network are allowed to run freely, drift, frequency and other errors gradually increase the time differences between the clocks of the network elements. Although such methods are robust, in the sense that failure of one clock does not cause failure of the system, and are relatively simple to maintain, the high cost of the clocks, which must be extremely accurate, is a major disadvantage of the method.

Thus it is desirable to have time information distributed between the clocks of the network. The network element clocks may receive time information from one source (the master clock) or the clocks may share time information between nodes. In either case, transmission delay errors must be accommodated. These errors occur as a result of the finite transmission times between network elements and as a result of processing delays. Minimization of the delay errors results in precision time distribution Such errors, particularly when time information is distributed from a master clock, are typically accounted for by a separate operation from the time distribution operation. In addition, previous methods using time information distributed from a master clock have utilized a series of two-node steps to achieve time synchronization of a large number of network elements.

In either case, whether the information is shared between clocks or distributed by two-node steps from a master clock, the resulting methods have been relatively complex, and have required several steps or operations.

EXAMPLES IN THE PRIOR ART

An example of a method and apparatus for network synchronization is found in Canadian Patent No.1,136,864 of Robert F. Vangen. This method of achieving network synchronization uses a separate operation for transmission delay compensation and distributes time information from a master clock in a series of two-node steps. In the method, a master clock sends time information to a remote clock and then receives time information back from the remote clock. The time information from the remote clock is compared with the time information of the master clock to determine, explicitly, the round trip delay. A time adjustment value may then be determined and sent to the remote clock.

Another method of network synchronization, similar to that of Vangen, is described in Canadian Patent No.1,158,739 of William Rodman and others. This too uses a separate operation to measure delay compensation and distributes time information from a master clock in a series of two-node steps. In the method, the master station first sends a signal to each remote station, receives a signal in response, calculates the delay between the stations, and sends a signal to each remote station which is representative of the delay between the master clock and the remote.

Both of these prior art methods are two-node systems in which the time information is sent step-by-step from node to node and require separate processing steps to determine the delay between master and slave sites. For each node, the time distribution is essentially completed before the process moves on to the next node.

The present method also uses distribution of time information from a master clock but utilizes a novel method of accounting for errors, and for distributing time information to a series of nodes. Rather than distributing the information step by step from one node to another, the process distributes the time information to a plurality of nodes with what is, in essence, a single step.

SUMMARY OF THE INVENTION

To accomplish absolute time synchronization of a network, the inventors have provided a method of synchronizing a plurality of nodes in a network, the network including a plurality of intermediate nodes serially bridged across an incoming and an outgoing transmission path, and including one loop node connected across the incoming and outgoing transmission path, the method comprising:

(1) transmitting a trigger signal along the outgoing transmission path;

(2) appending time information to the trigger signal on arrival of the trigger signal at the loop node and returning the trigger signal on the incoming transmission path;

(3) at each intermediate node,
  (a) detecting the trigger signal on the outgoing transmission path and on the incoming transmission path;
  (b) counting the elapsed time between the detection of the trigger signal on the outgoing transmission path and detection of the trigger signal on the incoming transmission path;

(c) adjusting the elapsed time for the two way travel time from the intermediate node to the loop node and for processing delays to produce adjusted time information representative of the one way travel time delay between the intermediate node and the loop node;

(d) latching the time information appended to the trigger signal returning on the incoming transmission path;

(e) adding the latched time information to the adjusted time information to produce synchronized time information; and (f) storing the synchronized time information in a real time clock register.

To accomplish this method, the inventors have provided, in one embodiment of the invention, a time transfer apparatus for synchronizing a plurality of nodes in a network, the nodes including a plurality of intermediate nodes serially bridged across an incoming transmission path and an outgoing transmission path, and including one loop node connected across the incoming and outgoing transmission path, the time transfer apparatus comprising:

(1) means for transmitting a trigger signal along the outgoing transmission path;

(2) means for appending time information to the trigger signal on arrival of the trigger signal at the loop node and returning the trigger signal on the incoming transmission path;

(3) at each intermediate node, (a) means for detecting the trigger signal on the outgoing transmission path and on the incoming transmission path;

(b) means for counting the elapsed time between the detection of the trigger signal on the outgoing transmission path and detection of the trigger signal on the incoming transmission path;

(c) means for adjusting the elapsed time for the two way travel time from the intermediate node to the loop node and for processing delays, to produce adjusted time information representative of the one way travel time delay between the intermediate node and the loop node;

(d) means for latching the time information appended to the trigger signal returning on the incoming transmission path;

(e) means for adding the latched time information to the adjusted time information to produce synchronized time information; and (f) real time clock register means for storing the synchronized time information.

Further summary of the invention may be found in the claims forming a part of this patent.

BRIEF DESCRIPTION OF THE DRAWINGS

Preferred embodiments of the apparatus of the invention and preferred methods of the invention will now be described with respect to the figures in which:

FIG. 1 is a schematic of a time transfer path between network elements in accordance with the method of the invention;

FIG. 3 is a schematic of the structure of a time transfer card according to the invention at a network element; and FIG. 4 is a flow diagram of the state of the time transfer card of a network element (in each of three roles) as the time transfer card performs the method steps.

DESCRIPTION OF PREFERRED EMBODIMENTS OF AN APPARATUS AND METHOD OF THE INVENTION

Figure 2A:
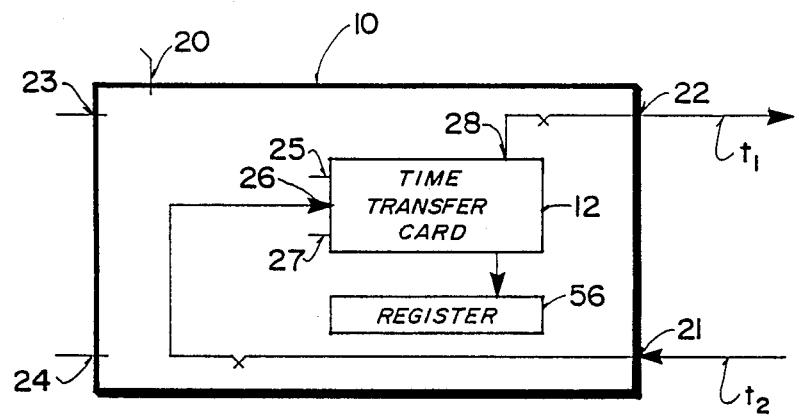
FIG. 2A is a schematic of a network element according to the invention configured as a trigger node.

This invention is particularly applicable to network elements that are digital cross connect systems (DCS) and is described with reference to such a system. The preferred embodiment described is designed to be compatible with SONET STS-1 or DS-3 network standards.

As seen in FIG. 1, a network, shown schematically in the entire Figure, is composed of network elements 10 designated by capital letters. The network elements 10 will be connected to each other. A control site or Network Operating Center (NOC) (not shown) will be connected to each network element.

As shown in FIG. 2, each network element 10 will include a time transfer card 12, configured in one of three ways (to be described in more detail later), and a fine time clock register 56. The fine time clock register 56 contains absolute time information. For the operation of the method of the invention, one of the network elements must contain time information in its fine time clock register 56 for later distribution to the other network elements. Each network element must also have coarse time information but this information is not subject to the precision time distribution.

The transfer of absolute fine time information to the network element 10 is accomplished in three phases. In phase 1, a single bi-directional idle transmission path 16 is connected by the NOC through all the network elements which are to receive time transfer information. In phase 2, the time transfer card 12 at each network element 10 is configured by the NOC in one of three ways. The network element may be a trigger node, intermediate node or a loop node. The intermediate nodes are bridged across the idle transmission path 16 through ports on the time transfer cards 12 of the network elements. The loop node connects the outgoing transmission path to the incoming transmission path of the bi-directional transmission path.

These network preparatory phases may be managed by the NOC as a background task during normal operations or at scheduled times as required. In phase 3, the execution phase, fine time information is distributed rapidly through the network elements on the idle transmission path 16, and stored in the time register of each of those network elements.

In phase 1 an out of service transmission path is established, to provide a bi-directional series path in any convenient order, through all of the network elements to be synchronized. The network element having the time information must be at one end of the path formed (at I or J in FIG. 1). Typical route and capacity redundancy levels in the transport network will provide the temporarily required transmission capacity.

For time transfer, the node opposite the network element having time information is called the trigger node, the network element having time information is the loop node, and all other network elements in the path are intermediate nodes. FIG. 1 shows an example where network I is the trigger node, network element J is the loop node, and network elements N - H are intermediate nodes. The path in the direction from the trigger node to the loop node is called the $t_1$ or outgoing path and the reverse direction path is the $t_2$ or incoming path.

Figure 2B:
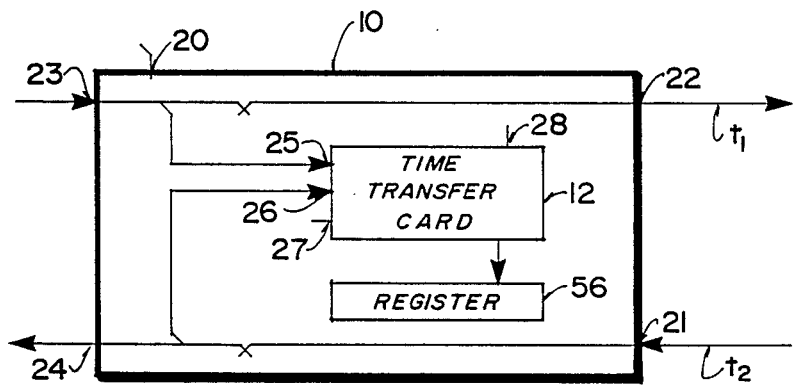
FIG. 2B is a schematic of a network element according to the invention configured as an intermediate node.
Figure 2C:
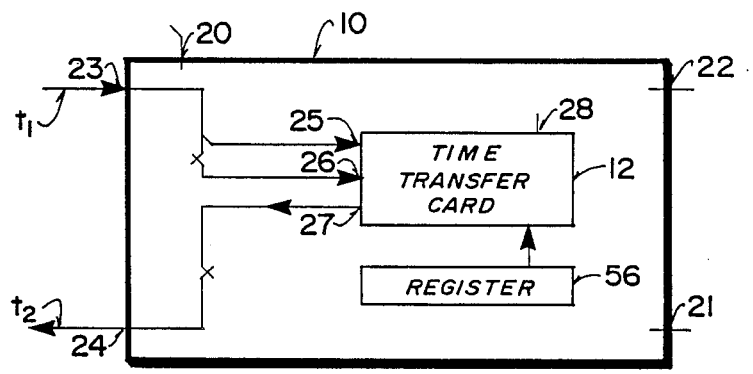
FIG. 2C is a schematic of a network element according to the invention configured as a loop node.

As shown in FIG. 2A, in phase 2, the time transfer card 10 at the trigger node is connected at port 22 to supply the $t_1$ path with a signal from a signal generator 18 at port 28 of the time transfer card 10 and to terminate the $t_2$ path at port 21. The signal generator 18 as shown in FIG. 3 is preferably an otherwise normal source of "keep alive" signal into which a single instance of a uniquely identifiable bit sequence, called the mark code (m-code) or trigger signal can be introduced. Ports 23 and 24 are not connected. Port 20 is connected to the NOC. Port 25 in each of FIG. 2B and 2C is the $t_1$ path(in) for connection to the input from the $t_1$ path at port 23. Port 26 in each of FIGS. 2A, 2B and 2C is the $t_2$ path(in) for connection to the input from the $t_2$ path at port 21 (trigger and intermediate node configuration), or from the $t_1$ path(in) at port 23 (loop node configuration). Port 27 in FIG. 2C is the $t_2$ path(out) for connection to the $t_2$ path at port 24.

At the loop node, the transmission path 16 is looped back through the time transfer card 10 through ports 23 and 24 as shown in FIG. 2C. Ports 21 and 22 are not connected. At each of the intermediate nodes, the time transfer card 10 is bridged across the $t_1$ path and $t_2$ path at ports 21, 22, 23 and 24, as shown in FIG. 2B. The signal generator 18 is not connected at the intermediate and loop nodes.

In phase 3, distribution of time information occurs. It does not proceed until the NOC gives a GO command to the trigger node. When so commanded, the trigger node embeds a single instance of the m-code (trigger signal) into the otherwise normal keep alive signal that it transmits into the $t_1$ path. The trigger signal is subsequently detected in hardware at each intermediate node as it transits the $t_1$ path past each intermediate node. Detection of the trigger signal on the $t_1$ path starts a counter, shown in FIG. 3, running at the transmission bit rate.

When the trigger signal is detected at the loop node, the contents of the fine time clock register 56 at that node (deemed to be the master clock) is appended to the trigger signal by over-writing the bits immediately following the trigger signal as the transmission path reverses. When the trigger signal is detected at each intermediate node (including the trigger node) on the $t_2$ path, the previously started counters are stopped and the fine time clock data following the trigger signal is latched. The accumulated value of the local counter is halved and added to the time data obtained from the passing signal. The sum plus a constant T is loaded into the local real time clock register 56, where it continues to be clocked by a 50 MHz line-derived clock or by another local clock of suitable frequency and stability, depending on the required drift rate of time-keeping clocks between time transfer updates.

T is a fixed compensation factor for the finite time taken to receive the clock data which follows the trigger signal and other processing delays. After the round trip propagation of the trigger signal, it can be shown that the fine time clock register contents at every node differ from the clock register at the loop node in a manner that depends only on the differential propagation delay between a given node and the loop node. Thus this method has only second order dependencies on absolute path length or temperature changes.

Time Transfer Support Hardware

The architecture of a generic circuit pack for a time transfer card which would interface to a network element of a DCS using two normal port appearances and would provide the hardware and control functionality necessary to support operation of a node as a trigger, loop, or intermediate node is shown in generic form in FIG. 3.

Configuration and control of the sub-circuits in FIG. 3 is performed by a finite state machine (FSM) 30 whose function is outlined in the flow diagram in FIG. 4. The support hardware operates with the DCS operating system 32 to provide precision time for operational use and to accept download of coarse time data such as year, month, day, hour, and minutes, which is stored in real time clock register 14. Typically, only seconds and sub-second time data stored in fine time clock register 56 need be subject to the precision time transfer process. In general, the fineness of the time information subject to time transfer must be greater than the worst case propagation delay. Both registers (56 and 14) are real time clock registers. However, to distinguish the two registers, the register containing fine time information is referred to as a fine time clock register. All of the time information could be subject to the time transfer process, but in most applications this is unnecessary.

The support hardware has two normal bi-directional port appearances to the central switch fabric. These are: [$t_1$ port(in) 25, blue/p(out) 28] and [$t_2$ port(in) 26, $t_2$ port(out) 27]. Connection of these ports to the central switch core is managed by the DCS operating system and NOC as normal connection or bridging operations during the configuration phase.

In the preferred hardware for carrying out the process of the invention, the time transfer card 12 at each network element 10 is configurable as either a loop node, intermediate node or trigger node under control of the NOC. A schematic of such an apparatus is shown in FIG. 3. The actual circuits for each of the circuit modules of the time transfer card 12 are not shown since their construction is conventional and well within the knowledge of a person skilled in the art, and any of various circuit designs could be used for each module.

FSM 30 controls the configuration of the time transfer card 12 on instructions from the NOC. If the network element is configured as a trigger node, then FSM 30 enables the 2:1 multiplexer 40 to receive a signal from the FSM 30 and pass it to the counter 42 to start the counter running at the network bit rate at the same time as the m-code signal is injected into the $t_1$ path. The role of 2:1 multiplexer 40 is controlled by output 34 from the FSM 30 which is input to the 2:1 multiplexer at 34A. If the network element 10 is an intermediate node or loop node then the 2:1 multiplexer 40 is set to receive signals from the detector 36 and pass them through to counter 42.

Also, if the network element 10 is configured as a trigger node, then the FSM 30 may also enable detector 44 through output 38 from the FSM 30. After this time transfer card 12 has been configured as a trigger node, the synchronization of the network elements is begun by the NOC instructing the FSM 30 to signal the signal generator 18 to inject the m-code (trigger signal) into the $t_1$ path at 28.

To ensure that the counter 42 counts at the network frequency, the counter 42 is connected to the carrier signal of the network system at 70. The trigger signal will then be travelling along the $t_1$ path to the other nodes while the counter 42 is counting at the carrier bit rate. Detector 44 will be enabled to receive the returning trigger signal on the $t_2$ path with appended time information. The 2:1 multiplexer 46 will not be engaged.

At each intermediate node in the network, the detector 36 will be enabled to receive the trigger signal on the $t_1$ path at 25. The 2:1 multiplexer 40 will be configured to receive output from the detector 36 and pass it to the counter 42. The 2:1 multiplexer 46 will not be engaged. As the trigger signal on the $t_1$ path enters the time transfer card 12 of the intermediate node at 25, it is detected by the detector 36. A signal is sent to the counter 42 through the 2:1 multiplexer 40 to start the counter 42 counting, at the carrier bit rate, as with the trigger node. Once the detector 36 detects the trigger signal, the detector 44 is enabled. The time transfer card 12, which is connected to both the $t_1$ and $t_2$ paths then counts a the network carrier bit rate while the trigger signal travels to the loop node and back.

At the loop node, the time transfer card 12, as shown in FIGS. 2C and 3, has both the detector 36 and detector 44 enabled by output 38 from the FSM 30 on instructions from the NOC. 2:1 multiplexer 40 is engaged to pass signals from the detector 36 to counter 42. The 2:1 multiplexer 46 is also engaged by the FSM 30. The incoming trigger signal at 26 on the $t_1$ path passes through 2:1 multiplexer 46 and returns on the $t_2$ path at 27. The trigger signal is also detected by the detector 36 on the $t_1$ path at 25. The detector 36 then signals the counter 42 to start counting and sends a signal through output 50 to input 50A on sender 52. On reception of the signal at 52, the time clock register 56 dumps its fine time information contents into sender 52 which sends the time information to 2:1 multiplexer 46 onto the $t_2$ path at 27 immediately following the returning trigger signal. There will be typically a known delay between the appended time information and the trigger signal. The trigger signal is also detected by the detector 44 which stops the counter 42. The counter 42 may then be reset by the FSM 30 through reset output 72 from the FSM 30, and input to the counter 42 at 72A, when desired. Fine time clock register 56 preferably also counts at the carrier bit rate, as input at 70 to ensure frequency synchronization of the time information sent to the intermediate node and trigger node.

On the return $t_2$ path, at each intermediate node, the returning trigger signal is detected by detector 42 which instructs the counter 42 to stop counting and send its contents to the adjuster 62. Adjuster 62 halves the time value of the contents of the counter 42, as an estimate of the one way travel time between the intermediate node and the loop node, adds processing delay factor T, and sends the adjusted time contents of counter 42 to adder 64. The delay T is to account for the known delay of the time transfer operation and the delay between the trigger signal and the appended time information. At the same time, detector 44 triggers the latch 60 which latches the time information following the trigger signal on the $t_2$ path. This time information is also sent by latch 60 to adder 64 where it is added to the adjusted time information of the counter and sent for storage to the fine register 56. The fine time clock register 56 will then contain the time information from the loop node, adjusted for the transmission from node to node (to the extent the $t_1$ and $t_2$ path delays are symmetrical) and for the processing delay.

The same process also occurs at each intermediate node and the trigger node so that each seconds register will have the same time information within error bounds discussed below.

A finite state machine description of the time transfer process control logic is shown in FIG. 4. In FIG. 4 each rounded numbered box (0 through 4) represents a stable state of the control hardware which will only be exited upon the occurrence of certain external messages or events 82, 94, 96, 104 to be described. The transitions between stable states cause the actions in the square boxes to be executed. In state 80 the FSM is idle. The message 82 is from the NOC and contains the following information: (1) instruction to participate in time transfer, (2) instructions for connection of the time-transfer card of the given nodes across or along the idle transmission path 16 through the ports 25, 26, 27 and 28, and (3) the role of the node in the upcoming time-transfer event. The node may be configured as a trigger node, intermediate node or loop node as shown at 84, 86 and 88. This can occur at any suitable time ahead of the actual time-transfer event to follow. If the message (82) from the NOC commands the particular node to participate in the role of trigger node, then the additional action of enabling the sequence generator 18 will occur in action block 90. Enabling the sequence generator only causes it to begin sending a filler or "keep alive" transmission pattern to the line. In any of the three cases of configuration as loop, trigger or intermediate nodes, after the action of configuring the time transfer hardware elements of FIG. 3 is complete, the control logic enters the corresponding one of three further stable states (107, 108 or 109) as shown in FIG. 4.

When it is desired to start the time synchronization process, not necessarily at the same time as the network elements are configured, the signal generator may be commanded by a message 94 to inject the mark code (or trigger code) into the $t_1$ path at the trigger node at 92 by instruction from the NOC 94. At the same time the trigger node's counter is started. Each other node remains in stable states 108 or 109 according to its assigned role until event 96 occurs, which is the detection of the mark code ("trigger signal") in their detectors 36 of FIG. 3. Reception of the trigger signal at each intermediate node starts their counter timing, shown at 98, a further stable state 100 is then entered. Reception of the trigger signal at the loop node appends the time information on the $t_2$ path behind the trigger signal, shown at 102. Reception of the returning trigger signal on the $t_2$ path at each intermediate node comprises the event 104 which causes the time transfer card 12 of the intermediate node to latch the time information, adjust it and store it as shown at 106, and return to the idle state 80.

Requirements On DCS Specification

The proposed method for precision time transfer requires no changes to the DS-3 or SONET signal standards in the preferred implementation because it works over out-of-service transport entities during which time the method supplies the working signal. However, the method ideally requires the following features of a participating machine:

N/N Cross Connection

The method preferably assumes a space-switched model of cross-connect functionality where the full time resolution of the transmission carrier signals is available to the time transfer process. DS-3/3 and SONET cross connects with STS-1 or STS-3 granularity are the preferred machines to support time transfer. However, it is possible to adapt the invention to N/X DCS functionality, with loss of performance, through two approaches:

(a) Migrate the method to a lower transmission level: in a 3/1 DCS, for example, the method is applied as described but is applied at the DS-1 level where the DCS provides an apparent space switching function.

(b) Adapt the method to work via overhead fields; an example where this might arise is a virtual tributary (VT) cross-connect which switches VTs only and always reconstructs new outgoing STS-1 signals. In this case, a true carrier rate space switching function is not provided. However, in such a design overhead fields that are meant to propagate across the network will be passed around the VT-switching core to the corresponding STS-1 output port. Time transfer can be adapted to work in this environment through reservation of appropriate overhead in the STS-1 signal format.

Bridging Connections

In the method as described the host DCS must support bridging connections. However, if a DCS does not provide bridging, the time transfer method can be adapted to work in a manner in which the time transfer card is placed in series in the $t_1$ path and $t_2$ path providing its own internal bridged signal access. For the purposes of this patent, such a time transfer card will be considered bridged across the $t_1$ path and $t_2$ path.

DCS Path Delay

There is no requirement on the magnitude of path delay for the host DCS machine but it is desirable that there is nominally constant delay for any one way path delay through the DCS. If a DCS has several nominal delay values due to internal switch core properties, there is no difficulty as long as the delays are known to the operating system so that equal delay paths through the DCS matrix can be selected, or so that the time transfer card can compensate for the DCS path delay mismatch.

Performance Consideration: Transmission Equipment Delay Symmetry

The precision attainable with this method is limited by the net delay asymmetry over the time transfer path between any particular node and the loop-node. The residual timing accuracy is therefore determined by delay asymmetries in DCS machines, cross office cabling, and transmission systems.

Performance Estimate

Jitter and wander add statistically to the fixed path delay asymmetries. Actual jitter levels in DS-3 networks are generally well below one unit interval (UI) peak-to-peak although specifications for the jitter tolerance of network equipment provide for testing at up to 5 UI peak-to-peak at low frequency. In calculating error bounds for the method, we assume a DS-3 based transport network and allow one UI rms jitter on each span, in each direction in the time transfer chain. Also, we allow 2 UI rms delay asymmetry in every DCS, and 8 UI rms delay asymmetry in each transmission span. If the delay asymmetries are uncorrelated, then an estimate of the maximum variance of timing uncertainty in a time transfer path of n nodes can be shown to be:

$$s = 4.18 * sqrt[n-1] \text{UI rms}$$

Therefore in a DCS-network simultaneously synchronizing 19 nodes to a 20th reference node, the residual timing error is, with 95.5% (two standard deviations) probability less than 813 nsec. The desired residual timing uncertainty and the number of nodes to be simultaneously synchronized may be traded-off.

Closed Time-Transfer Paths

An alternative to the proposed method is to arrange the time-transfer path in a loop which closes by merging the loop and trigger sites. For example, in FIG. 1B, the path could be extended from node I to node J with node J performing both trigger and loop-node functions. A closed path integrates the special trigger and loop functions at one site which may also be the NOC itself. All other DCS nodes can then use simplified hardware to support only the intermediate node role.

That is, the generator 18, 2:1 multiplexer 46 and sender 52, together with the supporting functions of the FSM 30 could be omitted in the time transfer card 12 as shown in FIG. 3, for all nodes except for the special joint trigger and loop node.

A closed path also permits the time-transfer process to be performed twice with a reversal of the $t_1$ and $t_2$ paths. This can be used to reduce the maximum residual timing error in a chain of nodes by a further sqrt(2) by arranging intermediate nodes to select the results of the transfer operation which involved the smallest local elapsed time count.

In addition, in the method and apparatus described it is assumed the trigger node will receive the time information in the same manner as other intermediate nodes and for that reason is in effect an intermediate node in the sense that it detects the trigger signal, counts delayed time and latches time information. However, it is also possible for the trigger node to emit the trigger signal and not participate further in the process. Alternatively, the trigger signal could be input at a point on the incoming or outgoing transmission paths that is not a node.

The described method and apparatus also assumes that the NOC begins the operation by establishing the bi-directional transmission path between the nodes receiving time information. It is also possible, with loss of flexibility, to have the network permanently configured with the bi-directional transmission path established between fixed nodes.

Alternative but equivalent time-transfer methods and apparatuses to the ones described in this patent may occur to a person skilled in the art, and these are intended to be included within the scope of the claims which follow.

We claim:

1. A method of synchronizing a network, the network including a plurality of intermediate nodes serially bridged across an incoming transmission path and an outgoing transmission path, and including one loop node connected across the incoming and outgoing transmission paths and including a node furthest from the loop node, the method comprising:

(1) transmitting a first trigger signal along the outgoing transmission path from the node furthest from the loop node;

(2) on arrival of the first trigger signal at the loop node, returning a second trigger signal on the incoming transmission path, the second trigger signal having time information appended to it;

(3) at each intermediate node, (a) detecting the first trigger signal on the outgoing transmission path and the second trigger signal on the incoming transmission path;

(b) counting the elapsed time between the detection of the first trigger signal on the outgoing transmission path and detection of the second trigger signal on the incoming transmission path;

(c) adjusting the elapsed time for two way travel time and for processing delays to produce adjusted time information representative of the one way travel time delay between the intermediate node and the loop node;

(d) latching the time information appended to the second trigger signal returning on the incoming transmission path from the loop node;

(e) adding the latched time information to the adjusted time information to produce synchronized time information; and (f) storing the synchronized time information in a real time clock register.

2. The method of claim 1 in which the first trigger signal is transmitted from the loop node.

3. The method of claim 2 in which the loop node is the network operating center.

4. The method of claim 1 further including the step of establishing the incoming and outgoing transmission paths between the plurality of nodes of the network.

5. The method of claim 1 carried out in a digital cross-connect system at the DS-1, DS-3, or STS-1 level.

6. The method of synchronizing a network of claim 1 in which the first trigger signal is returned on the incoming transmission path as the second trigger signal.

7. A time-transfer apparatus for synchronizing a network, the network including a plurality of intermediate nodes serially bridged across an incoming transmission path and an outgoing transmission path, and including one loop node connected across the incoming and outgoing transmission paths, the time-transfer apparatus comprising:

(1) means for transmitting a first trigger signal along the outgoing transmission path;

(2) means for returning a second trigger signal on the incoming transmission path, the second trigger signal having time information appended to it, on arrival of the first trigger signal at the loop node;

(a) means for detecting the first trigger signal on the outgoing transmission path and the second trigger signal on the incoming transmission path;

(b) means for counting the elapsed time between the detection of the first trigger signal on the outgoing transmission path and detection of the second trigger signal on the incoming transmission path;

(c) means for adjusting the elapsed time for two way travel time and for processing delays, to produce adjusted time information representative of the one way travel time delay between the intermediate node and the loop node;

(d) means for latching the time information appended to the second trigger signal returning on the incoming transmission path;

(e) means for adding the latched time information to the adjusted time information to produce synchronized tie information; and (f) real time clock register means for storing the synchronized time information.

8. The apparatus of claim 7 in which the loop node includes means for transmitting the first trigger signal.

9. The apparatus of claim 8 in which the loop node is the network operating center.

10. The apparatus of claim 7 further including means for establishing the incoming and outgoing transmission paths between the plurality of nodes of the network.

11. The apparatus of claim 7, in which the loop node comprises:

a real time clock register capable of containing time information;

detector means connected to the incoming transmission path and responsive to the first trigger signal for generating a detection signal;

return circuit means for returning a second trigger signal on the outgoing transmission path on receipt of the first trigger signal at the detection means; and sender means connected to the real time clock register and responsive to the detection signal for injecting the time information into the outgoing transmission path attended to the second trigger signal.

12. The apparatus of claim 7 in which each intermediate node comprises:

a real time clock register;

first detector means connected to the outgoing transmission path and responsive to the first trigger signal for generating a first detection signal;

second detector means connected to the incoming transmission path and responsive to the second trigger signal on the incoming transmission path for generating a second detection signal;

counter means responsive to the first and second detection signals for detecting elapsed time between detection of the first and second trigger signals by the first and second detection means;

means connected to the incoming transmission path and responsive to the second detector means for latching the time information appended to the second trigger signal;

means connected to the counter means for adjusting the elapsed time detected by the counter means for two-way travel time and processing delay; and means for adding the latched time information to the elapsed time information to create absolute time synchronized information and for sending the absolute time synchronized information to the real time clock register.

13. The time transfer apparatus for synchronizing a network of claim 7 in which the means for returning the second trigger signal includes means for returning the first trigger signal on the incoming transmission path as the second trigger signal.

14. A time transfer apparatus for a network element in a network having a plurality of network elements connected by a bi-directional transmission path, the bi-directional transmission path having an incoming transmission path and an outgoing transmission path, one of the plurality of network elements including means for returning a second trigger signal on the incoming transmission path with appended time information and the network including means for sending a first trigger signal along the outgoing transmission path, the time transfer apparatus comprising:

a real time clock register;

first detector means connected to the outgoing transmission path and responsive to the first trigger signal for generating a first detection signal;

second detector means connected to the incoming transmission path and responsive to the second trigger signal on the incoming transmission path for generating a second detection signal;

counter means responsive to the first and second detection signals for detecting elapsed time between detection of the first and second trigger signals by the first and second detector means;

means connected to the incoming transmission path and responsive to the second detector means for latching the time information appending to the second trigger signal;

means connected to the counter means for adjusting the elapsed time detected by the counter means for two-way travel time and processing delay; and means for adding the latched time information to the elapsed time information to create absolute time synchronized information and for storing the absolute time synchronized information in the real time clock register.

15. A time transfer apparatus for a network element in a network having a plurality of nodes, in which the network element is connected to the network by incoming and outgoing transmission paths, the network including means for sending a first trigger signal along the outgoing transmission path, the time transfer apparatus comprising:

a real time clock register capable of containing time information;

detector means connected to the incoming transmission path and responsive to the first trigger signal for generating a detection signal;

return circuit means for returning a second trigger signal on the outgoing transmission path upon detection of the first trigger signal; and sender means connected to the real time clock register and responsive to the detection signal for injecting the time information into the outgoing transmission path appended to the second trigger signal.

16. The time transfer apparatus of claim 15 in which eh network element includes means for generating the first trigger signal and means for injecting the first trigger signal into the outgoing transmission path.

17. The time transfer apparatus of claim 15 in which means for returning the second trigger signal includes means for returning the first trigger signal on the incoming transmission path as the second trigger signal.

* * * * *